UNITED STATES PATENT OFFICE.

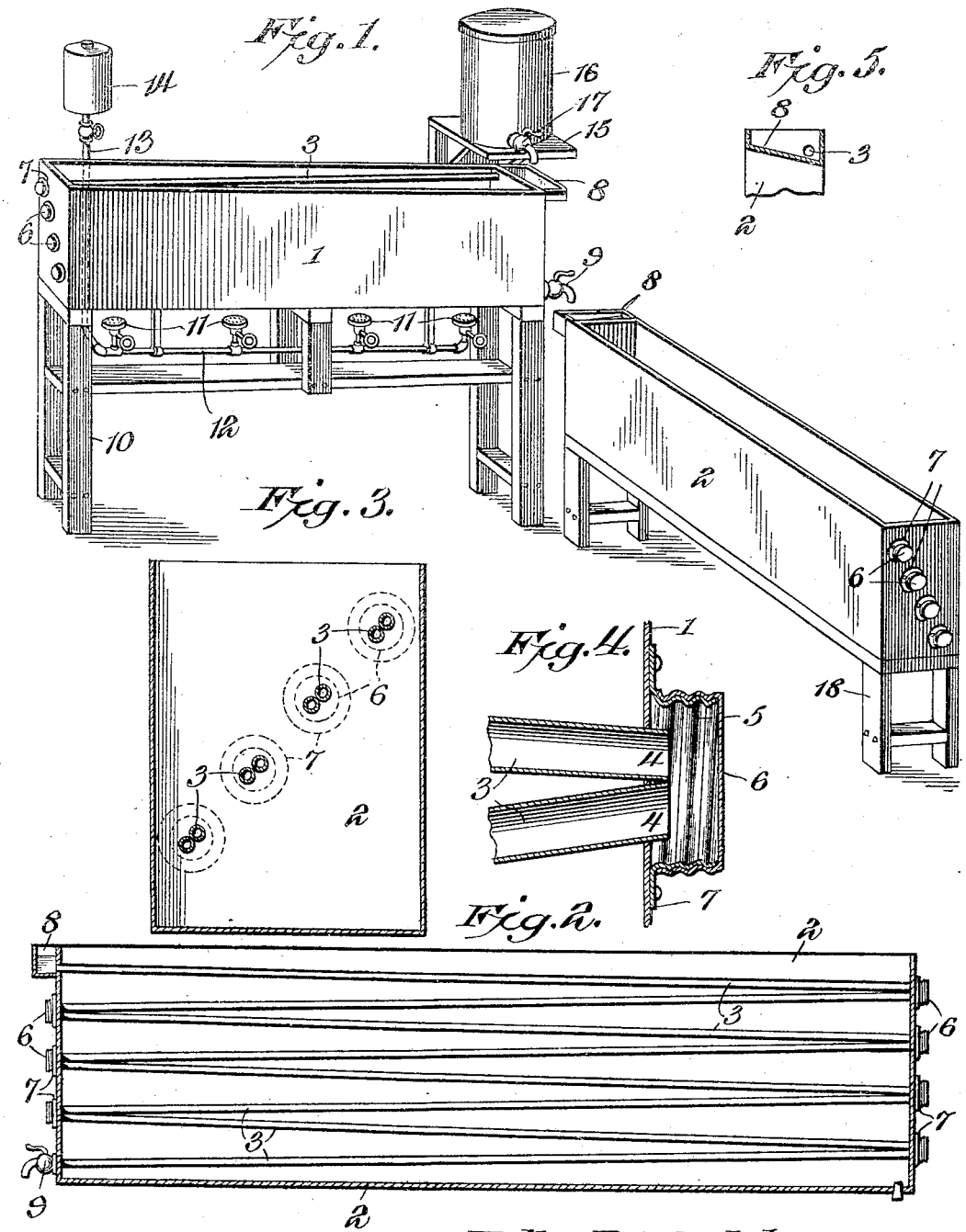

WALTER R. THATCHER, OF OSKALOOSA, IOWA.

MILK PASTEURIZER AND COOLER.

941,964. Specification of Letters Patent. Patented Nov. 30, 1909.

Application filed May 25, 1909. Serial No. 498,210.

*To all whom it may concern:*

Be it known that I, WALTER R. THATCHER, a citizen of the United States, residing at Oskaloosa, in the county of Mahaska and State of Iowa, have invented a new and useful Milk Pasteurizer and Cooler, of which the following is a specification.

The invention relates to a milk pasteurizer and cooler.

The object of the present invention is to improve the construction of milk pasteurizers and coolers, and to provide a simple, inexpensive and efficient apparatus of this character, which will not expose the milk to the air and germs and which may be easily cleaned and maintained in a sanitary condition.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a milk pasteurizer and cooler, constructed in accordance with this invention. Fig. 2 is a longitudinal sectional view of one of the casings. Fig. 3 is a transverse sectional view of the same. Fig. 4 is an enlarged detail view, illustrating the construction for connecting the adjacent ends of the circulating tubes. Fig. 5 is a detail view, illustrating the construction of the funnel or receptacle.

Like numerals of reference designate corresponding parts in all the figures of the drawing.

The milk pasteurizer and cooler comprises in its construction two similar casings 1 and 2, arranged at different elevations, the lower casing 2 being positioned to receive the milk after it has passed through the upper casing 1. The upper casing is designed for heating and pasteurizing the milk, while the lower casing 2 constitutes the milk cooler.

Each casing, which is constructed of sheet metal, or other suitable material, is preferably oblong in form and is equipped with a plurality of oppositely inclined circulating tubes 3, communicating at their adjacent ends and arranged in different vertical planes so as to form an inclined series, which is diagonally or obliquely disposed with relation to the casing, as clearly illustrated in Fig. 3 of the drawing. The adjacent ends 4 of the circulating tubes pierce the end walls of the casing and project slightly beyond the same, being arranged within an exterior annular flange or collar 5 and covered by a removable cap or closure 6, adapted to afford ready access to the circulating tubes for enabling a swab, or other means to be conveniently employed for cleaning the apparatus, so as to maintain the same in a perfectly sanitary condition. The flange or collar 5, which is provided with an inner attaching portion 7 is riveted or otherwise secured to the outer face of the end of the casing, and the said collar or flange is threaded to receive the cap 6, which is correspondingly threaded, but the removable cap or closure may be detachably mounted on the casing by a smooth collar or flange, or any other suitable means.

The upper end of the upper tube communicates with a receiving funnel 8, and the lower end of the lower tube is connected with a faucet 9 for controlling the flow of milk through the apparatus. The receiving funnel or receptacle, which may be of any preferred construction, has inclined walls for directing the milk into the upper tube. The inclination of the tubes causes the milk to flow back and forth through the tubes until it is discharged through the faucet 9, and by this arrangement of the tubes the milk is thoroughly subjected to the action of the heating or cooling agent contained in the casing and surrounding the tubes.

The upper casing 1 is supported at the desired elevation by a suitable frame 10, and it is designed to be supplied with water, which is heated by a series of burners 11, arranged below the bottom of the casing and connected by a horizontal pipe 12 and a vertical pipe 13 with a suitable fuel supply 14, which may consist of gasolene or other hydro-carbon, or where convenient the burners may be connected with a gas supply. The frame 10 is also preferably provided with a suitable shelf 15 for supporting a milk can 16, having a faucet 17, arranged above the receiving funnel 8 of the casing 1. The casing 2, which is supported by a frame 18 has its receiving funnel 8, arranged beneath the discharge faucet 9 of the casing 1, so as to receive the milk after it has passed through the circulating tubes of the casing 1 and has been pasteurized. While the lower casing 2 is shown arranged at right angles to the upper casing 1, this is not essential, as they may be disposed in any position in which the receiving funnel of the lower casing is located below the discharge faucet of the upper casing. The lower casing is designed to be filled with cold water, cracked ice, or any other cooling agent, which is adapted to thoroughly cool the milk. The length of time which the milk is subjected to the heating and cooling agents of the casings 1 and 2 may be controlled and varied by the faucets of the casings and the milk can. The frames, which support the upper and lower casings 1 and 2 and the milk can 16, may be of any desired construction, and although separate frames 10 and 18 are illustrated in the accompanying drawing to enable the casings to be arranged in different positions, a single supporting frame or frame-work may be employed, if desired. The casings are provided at the bottom with suitable means for drawing off the water after the milk has been pasteurized and cooled.

Having thus fully described my invention, what I claim as new and desire to secure by Letters Patent, is:—

1. An apparatus of the class described including a casing provided with straight circulating tubes extending entirely through the casing and having communicating terminals arranged in pairs, individual caps detachably mounted on the exterior of the casing and surrounding each pair of terminals and coöperating with the tubes to form a single continuous passage and when removed exposing both tubes of each pair.

2. An apparatus of the class described including a casing provided with straight circulating tubes having communicating terminals arranged in pairs and piercing the casing, collars arranged exteriorly of the casing and surrounding the terminals of the said tubes and provided with inner attaching portions secured to the casing, said collars being threaded, and screw caps removably fitted on the collars and adapted when detached to expose both tubes of each pair.

3. An apparatus of the class described including a casing provided with oppositely inclined circulating tubes arranged at different elevations and having their terminals located adjacent to each other and piercing the opposite walls of the casing and projecting exteriorly of the same, collars projecting exteriorly of the casing and receiving the said terminals of the tubes, caps removably fitted on the collars and forming closures for the same and when removed exposing each of the tubes, said caps coöperating with the tubes to form a single continuous passage for the milk, a receptacle connected with the upper end of the upper inclined tube at the inlet of the said passage, and means connected with the lower end of the bottom inclined tube for controlling the flow of milk through the said passage.

4. An apparatus of the class described including an oblong casing, an obliquely arranged series of circulating tubes oppositely inclined and located at different elevations and in different vertical planes and having contiguous terminals piercing the end walls of the casing and projecting exteriorly of the latter, and removable closures receiving each pair of contiguous terminals, said closures coöperating with the tubes to form a single continuous passage for the milk and when removed exposing both tubes of each pair.

5. An apparatus of the class described including upper and lower casings, located in different planes, one end of one of the casings being arranged adjacent to one end of the other casing and each provided with a series of oppositely inclined circulating tubes arranged at different elevations, receptacles communicating with the upper ends of the upper tubes of both pairs, means connected with the lower ends of the lower tubes for controlling the flow of milk through the same, the said means at the lower tube of the upper casing being arranged to discharge into the receptacle of the lower casing, and one or more burners arranged beneath the upper casing for heating the contents thereof.

In testimony, that I claim the foregoing as my own, I have hereto affixed my signature in the presence of two witnesses.

WALTER R. THATCHER.

Witnesses:
 SAML. L. HARMON,
 GEO. W. OZIAS.